UNITED STATES PATENT OFFICE.

DUNCAN BRUCE, OF PASPEBIAC, CANADA.

IMPROVEMENT IN ARTIFICIAL MANURE.

Specification forming part of Letters Patent No. 22,544, dated January 11, 1859.

*To all whom it may concern:*

Be it known that I, DUNCAN BRUCE, of Paspebiac, in the Province of Canada, have invented certain new and useful Improvements in the Manufacture of Artificial Manures, of which the following is a full, clear, and exact description and specification of my invention.

My invention has reference to the preparation of nitrogenous manures from animal matter, and has for its object so to fix the ammoniacal and other gases that they may be ready to act at once upon the crop without the necessity of waiting for the decomposition of the ammoniacal compounds, as is the case where they exist in the state of sulphates.

In soils abounding in carbonate of lime sulphate of ammonia is readily decomposed and given to the plants in the form of carbonate, as required; but there are many soils so deficient in lime as to be incapable of effecting this decomposition, and upon such soils those manures which owe their efficiency to the presence of sulphate of ammonia produce comparatively little effect, while the sulphate of ammonia, being readily soluble, is carried off by filtration, or is otherwise lost. To remedy this evil, and to produce a manure that shall be always ready for use upon any character of soil, is the object of my present invention, the first part of which consists in the employment, in connection with the animal matters, of a compound of carbonaceous and earthy substances so united by means of roasting the two in connection with each other that the carbon shall be disseminated through the whole body of the clay or other substance employed, by which means I obtain a complete absorbent of the ammoniacal and other gases and a powerful disinfector of the animal matter. Various substances may be employed in the preparation of this carbonaceous absorbent. That which I prefer is a species of bituminous shale found at Fort Daniel, near the mouth of the St. Lawrence river, as this mineral contains the carbon and the requisite earthy matter already most intimately united, and requires only to be roasted and ground to fit it for use. Where this substance is employed it is subjected to a sufficient degree of heat in a crucible or closed retort to carbonize the bituminous matter, and is then finely pulverized. This forms a powder which, when employed as hereinafter to be explained, acts as a powerful disinfector of putrescent animal matters, and as an absorbent of the gases which result from their decomposition. Where the bituminous shale cannot readily be procured its place may be supplied by a fictitious disinfector having all, or nearly all, the properties of that made from the shale produced by mixing certain carbonaceous matters with clay and other earthy substances, the materials being first pulverized and intimately mixed, and then roasted, the latter operation driving the carbon entirely through the body of the clay or other earthy substance, and producing an intimate mechanical union of the two. As a source of carbon the following substances may be employed: finely-pulverized bituminous or anthracite coal, sawdust, peat, (in powder,) or other suitable finely-divided carbonaceous matter.

As a base through which to disseminate the carbon I employ clay of the purest and best quality that may be procured. With this is incorporated about an equal quantity, by weight, of any of the before-mentioned carbonaceous substances. When these are not at hand the cheaper forms of tar, either mineral or vegetable, may be employed. These substances are to be intimately incorporated with the clay, and the mixture is then subjected to a sufficient degree of heat in a closed crucible, retort, or kiln to char the carbonaceous matter and drive it equally through the whole body of the clay, the latter becoming completely permeated with the carbon through its whole mass. Care should be taken that the heat be not sufficiently intense to vitrify the clay or to heat it beyond the point which shall develop its absorbant qualities. When sawdust or peat is employed the retort should be allowed to cool before it is opened. Otherwise the mixture may take fire and the object to be gained be defeated. The clay thus roasted has now become very porous and saturated with the carbon, as above stated, and in this state it is found to possess great powers for the absorption of ammoniacal and other gases, and as a disinfectant of fecal and other putrescent animal matters.

Thus far I have spoken of clay as the base employed in connection with the carbonaceous matters. Other articles—as coal-ashes, garden-mold, and soils more or less argillaceous— may be made to replace the clay, though the latter is the article which I prefer where the bituminous shale is not to be had.

The second part of my invention has reference to the preparation of the animal matters for the reception of the above-described powder. When boiling is resorted to for the purpose of reducing animal matters it is found impossible, unless they are subjected to the action of strong alkalies or to a high pressure of steam within a closed boiler, to reduce them to a uniform pulpy mass, and if this be not effected the pieces and grains of undissolved animal matter will subsequently be attacked by worms and destroyed. To accomplish this solution of the animal matters and to reduce them to a pulpy liquid state is the object of this part of my invention, which consists in subjecting them in vats to a temperature just sufficient to induce the degree of fermentation necessary to destroy their texture and reduce them to a watery mass, the vats being kept closely covered to prevent the loss of the gases generated by the decomposition. At this point of decomposition animal matters are found to act most rapidly and economically upon the growing crops; and the subsequent steps of the process have for their object only to arrest the decomposition at this point, and to fix and desiccate the juices and gases without altering their chemical state, and without loss or diminution.

The preliminary preparation of the animal matters, which forms the second part of my invention, I will now proceed to describe.

The animal substances, whether they be fish or offal of slaughter-houses, and whether they have been steamed or otherwise submitted to heat for the extraction of the oil or grease, or not, are thrown into vats of sufficient size to contain the accumulation of one day. These vats are then covered to exclude the air and the contents are warmed to 90° to 120° Fahrenheit. Where the temperature of the atmosphere is sufficient to effect this, artificial heat need not be resorted to. In the course of one to three days, according to the nature of the material employed, the fibers will be completely broken down, and the whole will become a semi-liquid pulpy mass, even the stomachs of the fishes and the cartilaginous and other refractory portions of the animal refuse will be entirely disorganized and reduced to a pulp. The prepared powder of shale or carbureted clay is now to be added to it by sifting it regularly over the whole surface in the proportion of about one pound of the powder to three pounds of the original matter employed, or thereabout, the mass being frequently stirred the while. The mixture is now to be evaporated either by artificial means or otherwise, and should any lumps occur they should be ground or crushed. When fish is used, as soon as the bone is separated from the fish it should be removed, dried, finely ground, and returned to the mixture. This ground bone should be returned immediately after the prepared powder is added to the fish. When slaughter-house offal is employed about thirty per cent. of ground bone may be added. When clear blood is used the powder should be mixed with it while it is yet fresh. The mixture is then kept at the required temperature for a period of forty-eight hours, or thereabout, when the powder will have become so intimately incorporated with the blood that the mixture may be evaporated. When night-soil is employed it is placed in the vats and the prepared powder is sifted into it. The solid portions of the night-soil unite with the carbureted clay and the superabundant liquid is evaporated, as before.

In manures thus prepared the gases resulting from the decomposition of the animal matter are mechanically united with the absorbent without being chemically changed. They are in consequence ready to act immediately upon the plants without requiring the presence of any substance to effect their decomposition.

I do not claim the use of burned clay as an absorbent, nor of charred vegetable substances for the purpose of disinfecting animal matters. Neither do I claim making use for the above purpose of any mixture of these substances when not prepared as above described; but What I do claim as my invention, and desire to secure by Letters Patent as a new article of manufacture, is—

The manure manufactured by the within-described process, the animal matters being first decomposed in the manner set forth, and subsequently disinfected by charred shale or its equivalent, as described.

DUNCAN BRUCE.

Witnesses:
SAM. COOPER,
THOS. R. ROACH.